UNITED STATES PATENT OFFICE.

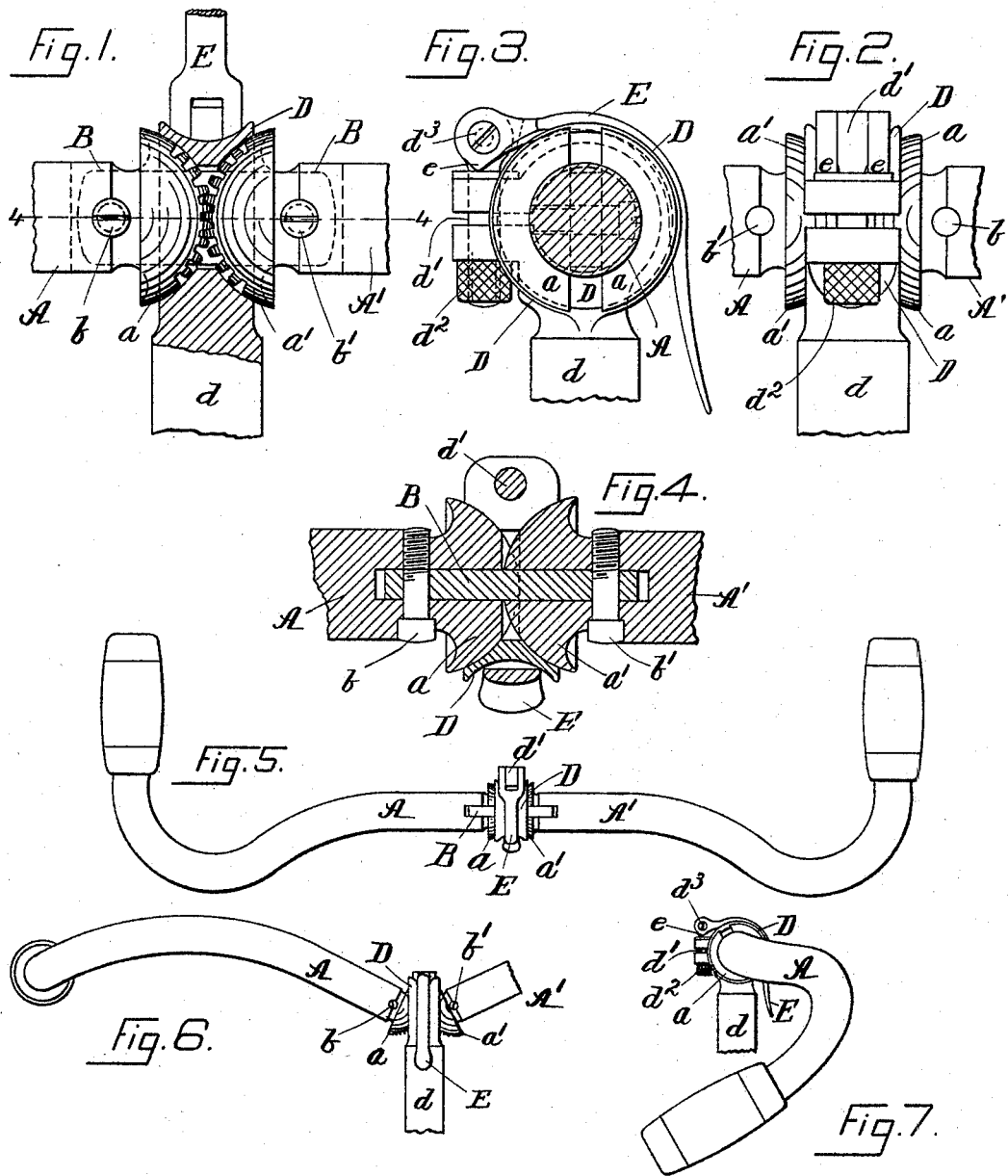
(No Model.)
L. H. COBB.
HANDLE BAR FOR BICYCLES.
No. 586,162. Patented July 13, 1897.
WITNESSES:
H. P. Guillo.
John R. Snow.
INVENTOR.
Lyman H. Cobb
BY
Maynadier + Mitchell,
ATTORNEYS.

LYMAN H. COBB, OF PORTLAND, MAINE.

HANDLE-BAR FOR BICYCLES.

SPECIFICATION forming part of Letters Patent No. 586,162, dated July 13, 1897.

Application filed April 27, 1896. Serial No. 589,169. (No model.)

*To all whom it may concern:*

Be it known that I, LYMAN H. COBB, of Portland, in the county of Cumberland and State of Maine, have invented an Improved Handle-Bar for Bicycles and other Vehicles, of which the following is a specification, reference being had to the accompanying drawings, in which—

Figure 1 is an elevation, partly in section, of my handle-bar and the connecting-link. Fig. 2 is a rear elevation with portions of the handle-bar broken off, and Fig. 3 a side elevation of Fig. 2. Fig. 4 is a section on line 4 4 of Fig. 1. Figs. 5, 6, and 7 show, upon a reduced scale, my handle-bar in various positions.

My invention is a handle-bar with a universal adjustment for bicycles or other vehicles; and it consists of a handle-bar in two parts, each part having a ball at its inner end and a split ring with concaved sides, which serves as a socket for the balls. The balls are connected together by a link passing through the socket-ring, so that when the socket-ring is contracted the balls are pushed apart as far as the link will allow, and any additional contraction of this socket-ring causes the faces of ring to bear harder against the balls and to hold them by friction in any desired position.

In the drawings, A A' are the two parts of the handle-bar, $a$ $a'$ the balls, and B the connecting-link, secured by pins $b$ $b'$ to the handle-bars A A', a slot being made in the end of each handle-bar to receive an end of the link. Fast to the upper end of post $d$, which is secured to the head of the bicycle, is the double socket D. The socket D is formed of a split ring with its edges concaved and is clamped by the bolt $d'$, having a nut $d^2$ at its lower end and an eye at its upper end, the pin $d^3$ connecting bolt $d'$ with cam-lever E. By means of cam-lever E with its cam $e$ the socket D is contracted, thus pushing the balls apart and causing the concave sides of the socket to press against the balls $a$ $a'$ and hold them by friction in any desired position.

It will be obvious that the handle-bar shown has free scope to move when socket D is loosened in either of two directions. First, either end may be moved upon its pin $b$ or $b'$, and, second, the handle-bars A A', connected by the link B, may be revolved in the socket D. The combination of these two motions makes possible any required position of the handle-bars, and the handle-bars may then be locked in place by tightening the socket D.

A second feature of my invention is providing the balls $a$ $a'$ with teeth which mesh together, so that when either part A or A' is moved upon its pin $b$ or $b'$ the other part moves equally upon its pin and yet the handle-bar and the link connecting its parts may be revolved in the socket, the link serving not only to hold the balls against the pressure of the socket, but also to cause either part A or A' to revolve when the other is revolved.

What I claim is—

1. The combination of the handle-bar in two parts A A'; the balls $a$ $a'$; link B; socket D and means for tightening the socket, substantially as described.

2. The combination of the handle-bar in two parts A A', the toothed balls $a$ $a'$; link B; socket D and means for tightening the socket, substantially as described.

LYMAN H. COBB.

Witnesses:
   E. L. GREENSLIT,
   G. W. DAVIS.